March 20, 1962 R. D. NIXON 3,026,418

PHOTOCONDUCTIVE DEVICES

Filed Feb. 11, 1959 2 Sheets-Sheet 1

INVENTOR
RALPH DESMOND NIXON
BY Kirschstein, Kirschstein & Ottinger
ATTORNEYS

March 20, 1962 R. D. NIXON 3,026,418

PHOTOCONDUCTIVE DEVICES

Filed Feb. 11, 1959 2 Sheets-Sheet 2

INVENTOR
Ralph Desmond Nixon
By Kurschner, Kurschner & Ottinger
ATTORNEYS

United States Patent Office 3,026,418
Patented Mar. 20, 1962

3,026,418

PHOTOCONDUCTIVE DEVICES

Ralph Desmond Nixon, London, England, assignor to The General Electric Company Limited, London, England Filed Feb. 11, 1959, Ser. No. 792,665
Claims priority, application Great Britain Feb. 17, 1958
14 Claims. (Cl. 250—211)

This invention relates to photoconductive devices.

The present invention is particularly, though not exclusively, applicable to photoconductive devices for use in electric switching or selecting devices such as described, for example, in British patent specification 835,424.

One form of switching or selecting device including a photoconductive device is described in British patent specification 835,424 with reference to FIGS. 1, 2 and 3 thereof. In this particular device there is a plurality of electrical conductors in electrical contact with each of the two parallel major surfaces of a body of photoconductive material, the projections of the conductors on one major surface onto the other major surface lying at right angles to the conductors on this other surface. The switching or selecting device also includes a punched card which is positioned to lie between one of the major surfaces of the photoconductive device and a light source. Holes in the punched card are positioned to allow light from this source to be incident upon the photoconductive material at only selected ones of the positions where conductors on the two major surfaces are separated by the shortest possible electrical path through that material. The positions of the holes in the punched card determines the switching or selecting function performed by the switching or selecting device, there being a comparatively low resistance path between a conductor on one of the two surfaces and a conductor on the other surface of the photoconductive material only if light is incident upon this material where the two conductors are separated by the shortest possible electrical path through that material.

It is an object of the present invention to provide an improved form of photoconductive device which may be used, for example, in a switching or selecting device such as described in said British patent specification with reference to FIGS. 1–3 thereof.

According to the present invention, in a photoconductive device, photoconductive material is disposed over a plurality of pairs of electrodes which lie upon a surface of electrically insulating material so that for each pair photoconductive material lies between, and in electrical contact with, the two electrodes of that pair, each of a plurality of mutually insulated electrical conductors extend through said insulating material to said surface at each of a plurality of spaced positions across that surface to make electrical connection with one of said electrodes, the conductors thereby making electrical connection with a first electrode from each pair of electrodes in respective groups of said pairs, and a plurality of further mutually insulated conductors are connected to the second electrodes of respective pairs of electrodes from each group, the device being adapted such that radiations may be incident, through the electrically insulating material, upon the photoconductive material between the electrodes of each pair to thereby cause a reduction in the electrical resistance between those electrodes.

According to a feature of the present invention an electric switching or selecting device comprises a photoconductive device as specified in the preceding paragraph, and means adapted such that in operation radiations are incident, through the electrically insulating material, upon the photoconductive material between the electrodes of only a selected one or more of the pairs of electrodes, the arrangement being such that, within the photoconductive device, the resistance of the electrical path between said conductors which are respectively connected to the first and second electrodes of any pair of electrodes is low only if that pair is a selected pair.

The radiations to which the photoconductive material is sensitive may be radiations of light or, for example, X-ray radiations. The light may be either visible or, as in the case of infra-red radiations, invisible to the human eye.

A photoconductive device according to the present invention, together with electric switching or selecting devices including that photoconductive device, will now be described, by way of example, with reference to the accompanying drawings in which.

Figures 1, 2:
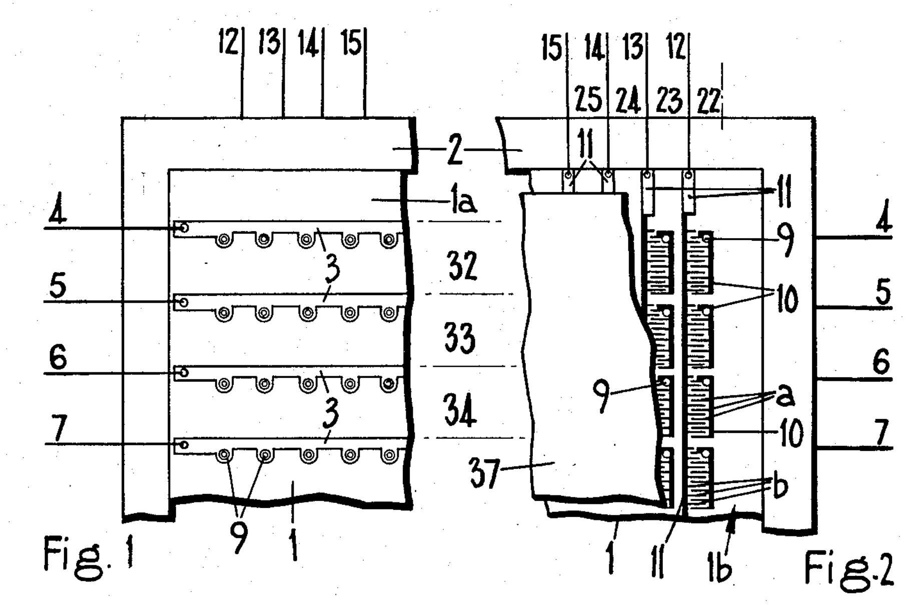
FIGURE 1 is a plan view, partly broken away, of the front of the photoconductive device.
FIGURE 2 is a plan view, partly broken away, of the back of the photoconductive device.
Figure 4:
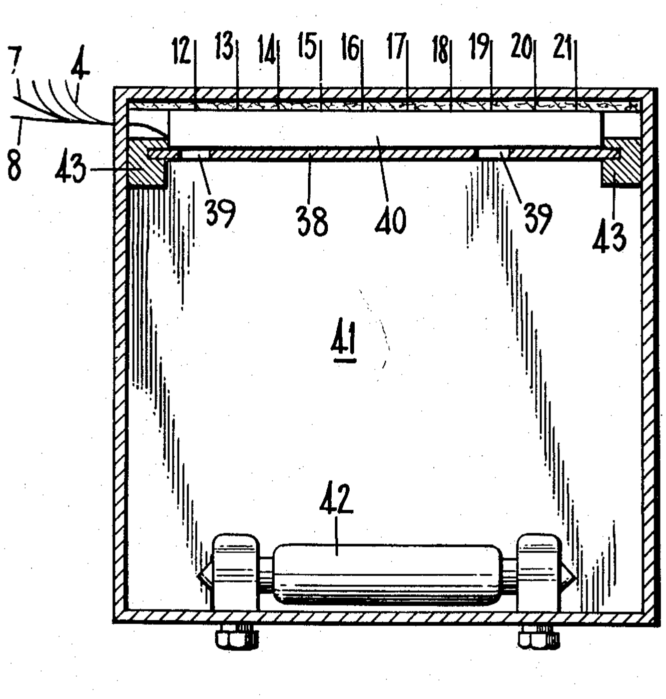
Figure 3:
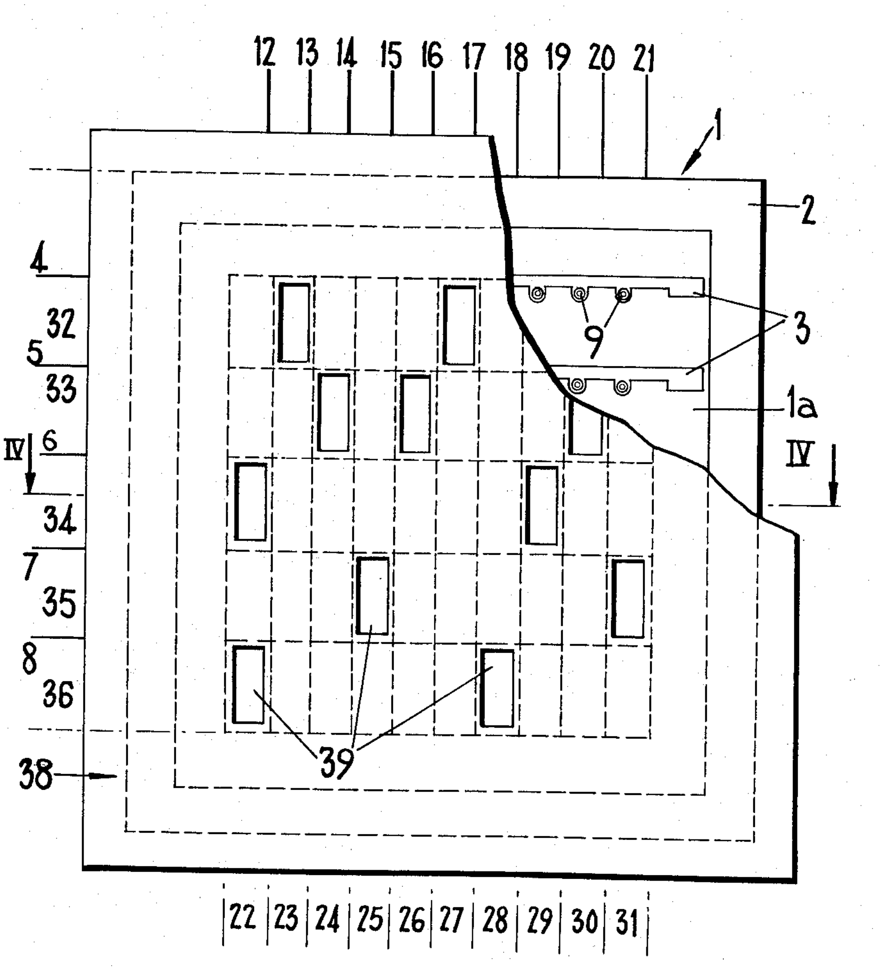

FIGURE 3 is a plan view of a switching or selecting device comprising the photoconductive device represented in FIGURES 1 and 2, and a punched card, this card being shown partly broken away; and FIGURE 4 is a diagrammatic sectional elevation of a switching or selecting device including the photoconductive device and the card shown in FIGURE 3, the section of this figure being taken on a line corresponding to the line IV—IV of FIGURE 3.

Referring to FIGURES 1 to 3, fifty pairs of electrodes are disposed over the back surface **1*b* of a member 1** of electrically insulating material. One of the electrodes in each pair comprises a set of seven interconnected electrode elements *a* and the other electrode comprises a set of seven interconnected electrode elements *b*. The two sets of elements *a* and *b* in each electrode pair are spaced apart from one another with the elements of each set interleaved with the elements of the other set.

The member 1, which is substantially transparent and has a front surface **1*a* opposite the surface 1*b*, is cemented within a rectangular frame 2. Five electrically conductive layers 3 (four only of which are shown) are disposed across the front surface 1*a* of the member 1, electrical connection being made to different ones of the layers 3 by different ones of five leads 4 to 8**.

Copper rivets 9 are riveted through the member 1 at ten spaced positions along each of the layers 3 such that each of these rivets 9 electrically connects that layer 3 to a set of the electrode elements *a* on the back surface **1*b***. The elements *a* of each set are electrically interconnected by a layer 10 individual to that set and which is formed with those elements upon the surface **1*b***.

Ten further electrically conductive layers 11 are disposed on the back surface **1*b* of the member 1 such that the layers 11 on the surface 1*b* lie transverse the layers 3 on the surface 1*a*. Each of the ten layers 11** makes electrical connection along its length with five sets of the electrode elements *b*. Electrical connection is made to the layers 11 by respective ones of ten leads 12 to 21.

The sets of electrode elements *a* and *b* lie on the surface **1*b* in ten columns 22 to 31 and five rows 32 to 36, the layers 11 lying along the lengths of respective columns 22 to 31, and the layers 3 lying parallel to the lengths of the rows 32 to 36 on the surface 1*a***.

Photoconductive material 37 is deposited over the member 1 to lie completely over and in electrical contact with the electrode elements *a* and *b*.

If in operation light is directed to be incident upon the front surface **1*a* of the transparent member 1, and to pass through that member to be incident upon the photoconductive material 37** between the electrode elements *a* and *b* of any one of the electrode pairs, the electrical resistance of this portion of the photoconductive material assumes a low value compared with that when no light is so incident. As a result, the resistance between the layers 3 and 11 connected to the sets of elements *a* and *b* in that electrode pair assumes a low value also.

The fact that the electrode elements *a* and *b* lie on the same surface of the photoconductive material 37 ensures that light incident upon the photoconductive material between them has the maximum effect and does not depend upon the penetration into the body of photoconductive material 37 by that light. In the photoconductive device described in said British patent specification with reference to FIGS. 1–3 thereof, the effective pairs of electrodes are on opposite surfaces of a body of photoconductive material so that the resulting change in resistance between any pair of electrodes for light incident upon that device is dependent upon the penetration of that light within the body of photoconductive material between those electrodes. Thus this latter photoconductive device requires a much higher intensity of light than is required with the photoconductive device described above with reference to FIGURES 1 to 3 of the drawings accompanying the present application, to produce a corresponding change in resistance between the electrode pairs. The fact that the electrode elements *a* and *b* in the present case are interleaved is also of advantage in this respect since the resistance between the electrodes of each pair depends upon the lengths of those edges of the electrodes which lie opposite one another across the photoconductive material.

The photoconductive device described above with reference to FIGURES 1 to 3 of the accompanying drawings may be used in combination with, for example, a punched card 38 as shown in FIGURE 3, to form a switching or selecting device.

Referring specifically to FIGURE 3, the card 38 having a number of holes 39 punched therethrough is situated adjacent to the surface 1*a* of the member 1 to interrupt light, except at the holes 39, which would otherwise be incident upon the whole of the surface 1*a*.

The holes 39 are located in the card 38 such that light incident upon the device through the holes 39 is only incident upon the photoconductive material 37 at selected intersections of the columns 22 to 31 with the rows 32 to 36. The light incident upon the device through the holes 39 is first incident upon the surface 1*a* and passes through the member 1 to be incident upon the photoconductive material 37 between the electrode elements *a* and *b* at each of those selected intersections. For example, one of the holes 39 is located at the intersection of the column 22 with the row 34, and another at the intersection of the column 28 with the row 36.

The photoconductive device together with the card 38, is preferably enclosed within a light-tight box as shown for example, in FIGURE 4.

Referring to FIGURE 4, the photoconductive device which will be referred to hereinafter as the "photoconductive device 40" (and which is not shown in section in FIGURE 4), is positioned within a light-tight box 41 such that light from a tungsten filament lamp 42, also enclosed within the light-tight box 41, is only incident upon the photoconductive device 40 through the holes 39 in the card 38. The card 38 is retained in a position adjacent to the surface 1*a* of the photoconductive device 40 by slotted members 43. The leads 4 to 8 and 12 to 21 pass out from the box 41, and it is arranged that the card 38 may be readily withdrawn from within the box 41, but that even with these latter provisions the box 41 remains substantially light-tight.

In operation, light from the lamp 42 is incident, as indicated above, upon the front surface 1*a* of the photoconductive device 40 and passes through the member 1 to be incident upon the photoconductive material 37 in contact with the surface 1*b* of the member 1. As a result, the resistance of the photoconductive material 37 between the electrode elements *a* and *b* at each of those intersections where light is incident, assumes a low value compared with that when no light is so incident. For example, the card 38 has a hole 39 punched therethrough at the intersection of the column 22 with the row 34, and therefore light will be incident upon the photoconductive material 37 in the device 40 between the electrode elements *a* and *b* at this intersection. This results in there being a relatively low resistance path between the layer 3 in the row 34 and the layer 11 in the column 22, and therefore between the lead 6 and the lead 12. Similarly, the card 38 has a hole 39 punched therethrough at the intersection of the column 28 with the row 36, and light is incident upon the photoconductive material 37 between the electrode elements *a* and *b* at this intersection, this resulting in the path between the lead 8 and the lead 18 assuming a relatively low value of resistance.

No light is incident upon the photoconductive material 37 at those intersections for which there are no holes (such as the holes 39) punched through the card 38. For example, no light is incident upon the photoconductive material 37 at the intersection of the column 23 with the row 34, the electrical resistance of the photoconductive material 37 between the electrode elements *a* and *b* at this intersection being, as a result, relatively high. In view of this there is a relatively high resistance path between the layer 3 in the row 34 and the layer 11 in the column 23, and therefore, between the lead 6 and the lead 13. Similarly, no light is incident upon the photoconductive material 37 at the intersection of the row 35 with the column 22, and therefore there is a relatively high resistance path between the lead 7 and the lead 12.

As a result there is a relatively low resistance path between certain of the leads 4 to 8 and certain of the leads 12 to 21, but a relatively high resistance path between others of those leads. The particular ones of the leads 4 to 8 and 12 to 21 between which there is a low resistance path (and consequently the particular ones of those leads between which there is a high resistance path) is of course dependent upon the positioning of the holes 39 in the card 38.

The switching or selecting device of FIGURE 4 may be incorporated in a translator (not shown) for an automatic telephone exchange, the translator providing, on the reception of signals indicating the destination of a call to be passed through that exchange, output signals which in themselves indicate, for example, the correct routing of that call through the exchange. Such translators are required, in particular, in so-called nation-wide or subscriber trunk dialling systems.

It is arranged that when one of five different code signals is passed to the translator incorporating the arrangement shown in FIGURE 4, a pulse signal is applied as a result between one of the leads 4 to 8 and earth from a relatively low resistance source (not shown). The resistance of this source may be, for example, only one-tenth of the resistance between the electrode elements *a* and *b* of an electrode pair when light is incident upon that photoconductive material at that intersection. Each of the five leads 4 to 8 is arranged to be associated with an individual one of the five code signals, the pulse signal being applied only to that one of the leads 4 to 8 which is associated wtih the code signal passed to the translator. In addition, the leads 12 to 21 are connected to earth through the windings of respective relays (not shown), the resistance of each such winding being comparable with the resistance of each of the sources connected to the leads 4 to 8.

It will be assumed for the purposes of the present description that as a result of a particular code signal applied to the translator a pulse signal is as a result applied between the lead 6 and earth.

In view of the fact that holes 39 are positioned in the row 34 only where this row intersects with the columns 22 and 29, there is a relatively low resistance path between the lead 6 and each of the leads 12 and 19, but a relatively high resistance path between the lead 6 and each of the leads 13 to 18, 20 and 21. The application of the pulse signal between the lead 6 and earth results therefore, in the passage of relatively large currents through the windings of the relays connected to the leads 12 and 19, but of only relatively small currents through the windings of the other relays.

Due to the fact that there is a plurality of holes 39 in the card 38 light is incident simultaneously upon the photoconductive material 37 at a plurality of the intersections of the columns 22 to 31 with the rows 32 to 36. It might be supposed therefore that while a pulse signal is applied between the lead 6 and earth, the currents through others of the relays connected to the leads 12 to 21 would be relatively large also. For example, holes 39 are located in the card 38 at the intersection of the column 22 with the row 36, and at the intersection of the column 28 with the row 36, in addition to the holes 39 located at the intersections of the columns 22 and 29 with the row 34. It might be expected therefore that there will be a relatively low resistance path extending from the lead 6, through the photoconductive material 37 between the electrode elements *a* and *b* at the intersection of the column 22 with the row 34, along the layer 11 in column 22, through the photoconductive material 37 between the electrode elements *a* and *b* at the intersection of the column 22 with the row 36, along the layer 3 in the row 36, through the photoconductive material 37 between the electrode elements *a* and *b* at the intersection of the column 28 with the row 36, and along the layer 11 in the column 28, to the lead 18. However, due to the non-linear relationship between applied voltage and the resulting current as exhibited by the photoconductive material 37, the resistance of such an unwanted path is in fact relatively large compared with that extending from the lead 6 to the lead 19. This non-linear relationship is such that the resulting current between the electrodes of any electrode pair is dependent upon, for example, the fourth power of the applied voltage.

By arranging that the resistances of the relay windings are each low, for example one-tenth, of the resistance between the electrodes of each pair when light is incident upon the photoconductive material between those electrodes, the voltages appearing across the pairs of electrodes in any unwanted path to cause current to flow in that path are low compared with the input voltage. This fact in conjunction with the non-linear relationship between applied voltage and resulting current causes the current through the above unwanted path extending between the lead 6 and the lead 18 to be negligibly small, this path extending through the photoconductive material 37 between electrode elements *a* and *b* at three of the intersections. Similarly any other such path between the lead 6 and any one of the leads 13 to 18, 20 and 21, extends through the photoconductive material 37 between the electrode elements *a* and *b* at a minimum of three of the intersections, so that the current through the windings of the relays connected to any of these leads and due to any such paths, will be negligibly small.

The resistance of the path between the lead 6 and each of the leads 13 to 18, 20 and 21, may be some five thousand times greater than the resistance of the path between the lead 6 and the lead 12 and that between the lead 6 and the lead 19. Therefore the relays connected to the leads 12 to 21 are easily arranged to be responsive only to the relatively large currents such as flow between the lead 6 and each of the leads 12 and 19, when the pulse signal is applied to the lead 6. As a result, only the relays connected to the leads 12 and 19 are operated upon the application of the pulse signal to the lead 6, and in this manner the combination of the relays which are so operated (or, likewise, the combination of those which remain unoperated) provides an indication of the translation of the code signal applied to the translator.

In a similar manner any other code signal applied to the translator is translated as required, the particular combination of relays which are operated as a result of such application (or, likewise, the combination of relays which remain unoperated during such application) providing an indication of this translation. Each of the relays may be provided with contacts which when that relay is operated (or remains unoperated) apply, for example, a pulse signal to other apparatus in the exchange, the combination of pulse signals so applied being characteristic of the code signal applied to the translator, and possibly, of the desired routing of, and charge to be made for, a call set up through the exchange as a result of that code signal.

The actual translation provided by the translator is dependent upon the number and positioning of the holes 39 in the card 38 at the intersections of the columns 22 to 31 with the rows 32 to 36, thus the translation provided thereby may be changed simply by replacing that card 38 with another such card having a different distribution of holes therein. Cards such as the card 38 may be punched with holes such as the holes 39 at a central office and then distributed to telephone exchanges incorporating this form of translator. Thus the operation of changing the routing of calls, and, or alternatively, the charges to be made for such calls, is relatively simple.

Although the operation of the switching or selecting device as shown in FIGURE 4 has been described above in relation to a translator for use in an automatic telephone exchange, it will be appreciated that such a device is also applicable for use in other ways in automatic telephone exchanges, and also in other types of apparatus such as, for example, computers.

The photoconductive device represented in FIGURES 1, 2 and 3 is constructed by etching the layers 3, 10 and 11 together with the electrode elements *a* and *b* from the copper layers bonded to opposite surfaces of a base in a copper clad laminate. A suitable laminate that has been used is that which was sold by Ashdowns Ltd. as "MG401 Copper Clad Epoxy Laminate," the member 1 being constituted in this case by the base of the laminate itself.

After the formation of the layers 3, 10 and 11 and the elements *a* and *b*, the rivets 9 are riveted to the member 1 to connect the layers 3 to the electrode elements *a*. The photoconductive material 37, in powdered form, is dusted over the surface 1*b*, and then sprayed with a binder, a suitable binder being, for example, a solution of cellulose nitrate in amyl acetate. Alternatively, the preparation sold as "Kodak Photo Resist" by Kodak Ltd., may be used as a binder.

The photoconductive material 37 may be any suitable material which is both photo-sensitive and has a relatively high electrical resistance when light is not incident thereon. A suitable material is, for example, cadmium sulphide activated with copper and chlorine. A method of manufacturing such material is described in British patent specification 823,187.

The leads 4 to 8 and the leads 12 to 21 are soldered to the respective layers 3 and 11.

The photoconductive device as a whole may be coated with a thin film of wax to provide protection against moisture.

I claim:

1. A photoconductive device comprising a member of electrically insulating material which is substantially transparent to radiations; a plurality of groups of pairs of electrodes mounted upon a surface of said member with first and second electrodes of each pair spaced apart from one another across said surface; photoconductive material disposed over said electrodes to lie between and in electrical contact with the two electrodes of each pair; a plurality of mutually insulated electrical conductors each of which comprises first portions that extend through said member to said surface at spaced positions across that surface to make electrical connection with the first electrodes respectively of the pairs of electrodes in a respective one of said groups, and second portions that interconnect the first portions at their ends remote from said surface; and a plurality of further mutually insulated electrical conductors which are electrically connected in each group to the second electrodes of the pairs of electrodes respectively.

2. A photoconductive device according to claim 1 wherein said further conductors are secured to said surface.

3. A photoconductive device according to claim 2 wherein the pairs of electrodes lie on said surface in a plurality of rows and columns, and wherein said further conductors lie along the lengths of said columns respectively.

4. A photoconductive device according to claim 3 wherein each of said further conductors and each of said electrodes is a respective layer of electrically conductive material bonded to said surface.

5. A photoconductive device comprising a member of electrically insulating material which is substantially transparent to radiations and has two parallel plane surfaces; a plurality of pairs of electrodes that are mounted upon a first of said two surfaces in rows and columns with first and second electrodes of each pair spaced apart from one another across said first surface; photoconductive material that lies between and in electrical contact with the two electrodes of each pair; a plurality of mutually insulated electrical conductors that extend along the lengths of the rows respectively, each said conductor comprising mutually spaced first portions that are electrically connected on said first surface to the first electrodes respectively in the respective row and that extend through the said member from the first surface to the second surface, and second portions on said second surface that electrically interconnect the first portions; and a plurality of further mutually insulated electrical conductors that extend along the lengths of the columns respectively on said first surface, and that are electrically connected to the second electrodes in the respective columns.

6. A photoconductive device according to claim 5 wherein each of said second portions of said first-mentioned conductors is a respective layer of electrically conductive material bonded to said second surface.

7. A photoconductive device according to claim 5 wherein each of the electrodes comprises a plurality of interconnected electrode elements, and wherein the elements of the two electrodes of each pair are interleaved with one another.

8. A photoconductive device according to claim 5 wherein the photoconductive material is cadmium sulphide.

9. A photoconductive device according to claim 8 wherein the cadmium sulphide is activated with copper and chlorine.

10. A photoconductive device comprising a member of electrically insulating material which is substantially transparent to radiations and has two parallel plane surfaces; a plurality of pairs of electrodes that are mounted upon a first of said two surfaces in rows and columns with first and second electrodes of each pair spaced apart from one another across said first surface; photoconductive material that lies between and in electrical contact with the two electrodes of each pair; a plurality of mutually insulated electrical conductors that lie on the second of the two surfaces of the insulating member and extend along the lengths of the rows respectively; electrically conductive rivets that are riveted to the insulating member to extend between the said first and second surfaces at spaced positions along the rows, the rivets in each row electrically connecting the first electrodes respectively of the row to said conductor of that row; and a plurality of further mutually insulated electrical conductors that extend along the lengths of the columns respectively on said first surface, and that are electrically connected to the second electrodes in the respective columns.

11. An electric switching or selecting device comprising a member of electrically insulating material which is substantially transparent to radiations; a plurality of groups of pairs of electrodes mounted upon a surface of said member with first and second electrodes of each pair spaced apart from one another across said surface; photoconductive material that lies between and in electrical contact with the two electrodes of each pair; a plurality of mutually insulated electrical conductors each of which comprises first portions that extend through said member to said surface at spaced positions across that surface to make electrical connection with the first electrodes respectively of the pairs of electrodes in a respective one of said groups, and second portions that interconnect the first portions at their ends remote from said surface; a plurality of further mutually insulated electrical conductors which are electrically connected in each group to the second electrodes of the pairs of electrodes respectively; and means that is adapted to interrupt radiations that are directed to be incident through said member upon all said pairs of electrodes, to allow the radiations to be incident upon the photoconductive material between the electrodes of selected ones only of said pairs of electrodes.

12. An electric switching or selecting device according to claim 11 wherein the means to interrupt radiations is a substantially opaque card having through holes therein at positions corresponding to said selected pairs of electrodes.

13. An electric switching or selecting device according to claim 12 wherein said member is substantially transparent to visible light, and wherein there is provided a source of visible light to direct light towards all said electrodes through said member.

14. An electric switching or selecting device according to claim 13 wherein said source of light is a tungsten filament lamp.

References Cited in the file of this patent

UNITED STATES PATENTS

| | | |
|---|---|---|
| 2,605,965 | Shepherd | Aug. 5, 1952 |
| 2,668,184 | Taylor et al. | Feb. 2, 1954 |
| 2,728,835 | Mueller | Dec. 27, 1955 |
| 2,747,104 | Jacobs | May 22, 1956 |
| 2,789,193 | Anderson | Apr. 16, 1957 |
| 2,899,659 | McIlvaine | Aug. 11, 1959 |